United States Patent Office 3,218,276
Patented Nov. 16, 1965

3,218,276
BENZIMIDAZOLE STABILIZED POLYOLEFIN
COMPOSITIONS
Eugene L. Ringwald and Cilton W. Tate, Cary, N.C., assignors to Monsanto Company, a corporation of Delaware
No Drawing. Filed June 18, 1962, Ser. No. 202,951
6 Claims. (Cl. 260—23)

This invention relates to the stabilization of polyolefin compositions. More particularly, this invention relates to the stabilization of polyolefin compositions against deterioration resulting from exposure to sunlight or ultraviolet light by the incorporation therein of an alkyl benzimidazole.

Thermoplastic compositions have found wide acceptance as useful materials for making films, foils, fibers, filaments, and other articles. These articles are inherently strong, dimensionally stable, relatively inert to common household solvents and are easily colored for an attractive appearance. However, it is known that such compositions and articles produced therefrom are subject to rapid and severe degradation and discoloration when exposed to elevated temperatures and to light, particularly ultraviolet light. The problem is extremely serious when such polymeric compositions are thermally fabricated into fibers to be employed in window curtains, automobile seatcovers, and the like, which are exposed for prolonged periods of time to relatively high temperatures and to direct sunlight. It has become common to incorporate certain additives into the composition as heat stabilizers and as light stabilizers to overcome this instability.

A number of ultraviolet light inhibitors are known which inhibit the photo degradation of many polymers, resins, and plastics. However, it is known that the polyolefin compositions are much more sensitive than other polymer systems to photo degradation. Many effective stabilizers for halogen containing polymers, for example, polyvinylene chloride, polyvinyl chloride, and the like, are non-effective stabilizers in polyolefins. This is due to the fact that stabilizers in halogen containing polymers function essentially as hydrogen halide scavengers while stabilizers for the halogen free polyolefins operate on a different principle. Ultraviolet inhibitors which are especially suited for cellulosic esters, such as cellulose triacetate, cellulose acetate butyrate, and the like, are not necessarily effective ultraviolet inhibitors for polyolefins due to the inherently different nature of the polyolefins.

Polyolefins, such as polyethylene, polypropylene, and the like, are subject to photo oxidation when exposed to sunlight. This oxidation is characterized in its early stages by the breaking of the polymer chain and the formation of carbonyl groups. As the oxidation continues the polymer cracks and loses tensile strength to the point of mechanical failure.

In the preparation of polyolefin fibers a uniform dispersion of the stabilizer in the polyolefin is desired. Therefore, it is necessary that the stabilizer be blended with the polymer before spinning. Most presently known ultraviolet stabilizers are thermally unstable and decompose during the spinning process. This results in the formation of undesirable color and/or the loss of physical properties of the fiber. In order for the ultraviolet stabilizer to be satisfactory for use in polyolefin compositions it should be thermally stable; it should be stable itself towards ultraviolet light; it must not be colored or develop any color during use; and it must be compatible with the polymer used.

It is an object of this invention to provide new ultraviolet light stabilizers for polyolefin compositions.

It is another object of this invention to provide new ultraviolet light stabilizers for polyolefin compositions which are essentially colorless and will not form color on exposure.

It is a further object of this invention to provide new ultraviolet light stabilizers for polyolefin compositions which will be effective when used in small concentrations.

It is a further object of this invention to provide new ultraviolet light stabilizers for polyolefin fibers which are thermally stable under the spinning conditions used to prepare the fibers.

Other objects and advantages of this invention will be apparent from a consideration of the description of the invention which follows hereafter.

In accordance with the present invention it has been found that when an alkyl benzimidazole is added to a polyolefin composition the alkyl benzimidazole acts as a stabilizer against the effects of ultraviolet light.

The alkyl benzimidazoles used to prepare the compositions of this invention are compounds having the formula

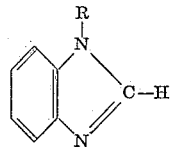

wherein R is an alkyl group containing from 3 to 20 carbon atoms. Illustrative of suitable alkyl benzimidazoles coming within the scope of the above structural formula as the following: N-(n-propyl) benzimidazole, N-(n-butyl) benzimidazole, N-(n-amyl) benzimidazole, N-(n-nonyl) benzimidazole, N-(n-tridecyl) benzimidazole, N-(n-hexadecyl) benzimidazole, N-(2-ethyl-heptadecyl) benzimidazole, N-(n-eicosyl) benzimidazole, N-(iso-propyl) benzimidazole, N-(iso-butyl) benzimidazole, and the like.

The alkyl benzimidazole used in the preparation of the compositions of this invention may be present in an amount of from about 0.05 percent to about 5.0 percent, based on the total weight of the composition. It is preferred that the alkyl benzimidazole be present in an amount of from about 0.5 percent to about 2.0 percent, based on the total weight of the composition.

The alkyl benzimidazoles may be used to stabilize a wide variety of polyolefin compositions against deterioration resulting from exposure to ultraviolet light. The olefin polymers and copolymers of this invention are those obtained by the polymerization of olefins and branched olefins containing from 2 to 10 carbon atoms in the monomeric chain. Illustrative of suitable monomers are ethylene, propylene, 1-butene, isobutylene, 1-penten, 4-methylpentene-1, 2-butene, 2-pentene, 2-methylbutene-1, 2-methylbutene-2, 3-methylbutene-1, 3-ethylbutene-1, 1-hexene, 2-hexene, 1-heptene, 1-octene, 2-octene, 2-methylpentene-1, and the like. Copolymers of the above mentioned monomers may also be used for the purposes of this invention.

The alkyl benzimidazoles may be incorporated into the polyolefin compositions by conventional methods used for blending such materials into plastics. Illustrative of methods that may be employed are as follows: melt blending, dry blending, solution blending, sorption of a solution of stabilizer on dry polymer, and the like.

The polyolefin compositions stabilized in accordance with this invention have excellent life expectancy and can be used for a wide variety of uses. The stabilized polyolefins of this invention may be used in outdoor uses requiring prolonged exposure to the sunlight. Polyolefin compositions stabilized in accordance with this invention can be cast, rolled, extruded, or molded into sheets, rods, piping, tubes, fibers, and other shaped articles. These compositions may also be used for coating such materials as paper, metal foil, wire, glass fiber fabrics, and the like.

The polyolefin compositions of this invention are especially suited to be spun into fibers having excellent stabilization against ultraviolet light. These fibers may be manufactured by several methods of spinning, such as melt spinning, dry spinning, and wet spinning.

In the melt spinning method, the polymer is heated to a high temperature until it becomes molten and is thereafter forced through sandpacks and the like, and then through spinnerets from which it is extruded.

In the dry spinning method, the polymer is dissolved in a suitable solvent and, subsequently, extruded from spinnerets into a heater atmosphere in order to evaporate the solvent.

In the wet spinning method, the polymer is dissolved in a suitable solvent and extruded from a spinneret into a coagulating bath capable of leaching the solvent from the fiber.

The polyolefin compositions of this invention are especially suited for spinning by the melt spinning method. Extremely high temperatures must be used in melt spinning and this requires the exercise of extreme care in order to prevent the decomposition of the polymer. Most presently available ultraviolet stabilizers will decompose when heated to the high temperatures necessary in a melt spinning operation. It has been found that the alkyl benzimidazoles of this invention will not decompose at the high temperatures used in melt spinning.

In preparing polyolefin fibers the alkyl benzimidazoles are blended with the polymer before spinning in a conventional spinning process to produce the fiber. This is necessary in order to obtain a uniform dispersion of the alkyl benzimidazole in the polymer. If it is desired to use other additives such as heat stabilizers, anti-static agents, fire retarding agents, dyes, plasticizers and the like in the polymer solution, they may be incorporated therein without the danger of decomposition or seriously effecting the properties of the end product at any time prior to spinning into the filament formation.

The following example is intended to illustrate the new compositions of this invention more fully, but is not intended to limit the scope of the invention. In the example, all parts and percentages are by weight unless otherwise indicated.

Example

Slurry A was made by placing 700 grams of powdered polypropylene in a Waring Blender and adding thereto 2 liters of n-hexane. A heat stabilizer consisting of 2.8 grams of Tyox (dilauryl thiodiproprionate), 2.1 grams of Santowhite [4,4'-butylidene bis (6-tert-butyl-m-cresol)], 1.05 grams of zinc stearate, and 1.05 grams of Polygard [tris (nonylphenyl) phosphite] was slurried in 250 ml. of n-hexane in a beaker and 3.5 grams of N-(n-propyl) benzimidazole were added to this slurry. This stabilizer slurry was then added to slurry A. The beaker used in the preparation of the stabilizer slurry was washed with 50 ml. of n-hexane and the washings were also added to slurry A. The resulting slurry was then blended for 15 minutes. The n-hexane present was removed by evaporation and the residue was dried at 65° C. in a vacuum oven for approximately 6 hours. The dry polymer obtained was then blended for 30 minutes. The polymer was found to have a whiteness value of 100. The test employed to determine this value consisted of determinations on the proximity to complete whiteness, i.e. 100, by reflectance measurements made by using a spectrophotometer. The methods used were those recommended by the Standard Observer and Coordinate System of the International Commission on Illumination as fully set forth in the Handbook of Colorimetry, published in 1936 by the Technology Press, Massachusetts Institute of Technology.

Fiber was made from the above identified polymer by a conventional melt spinning process. The fiber was spun at a pack temperature of 260° C. and a transition line temperature of 246° C. The fiber was then drawn at a temperature of 135° C. The fiber was found to have a whiteness value of 89.7 as defined above.

The fiber was determined to have 57 percent strength retention after an exposure of 30,000 langleys in Arizona sunlight as compared to 48 percent for the unstabilized polymer.

The fiber was determined to have 70 percent strength retention after 50 hours exposure in a Fade-O-Meter as compared to 28 percent for the unstabilized polymer.

As many variations within the spirit and scope of this invention will occur to those skilled in the art, it is to be understood that the invention is not limited to the specific embodiments thereof except as set forth in the appended claims.

We claim:
1. A new fiber-forming composition of matter comprising polypropylene, from about 0.5 percent to about 2.0 percent, based on the total weight of the composition, of a heat stabilizer comprising about 40 percent of dilauryl thiodipropionate, about 30 percent of 4,4'-butylidene bis (6-tert-butyl-m-cresol), about 15 percent of zinc stearate, and about 15 percent of tris (nonylphenyl) phosphite, each percent being based on the total weight of the stabilizer, and from about 0.2 percent to about 2.0 percent, based on the total weight of the composition, of N-(n-propyl) benzimidazole.

2. A new fiber-forming composition of matter comprising a polyolefin derived from a mono-olefin containing from 2 to 10 carbon atoms in the monomeric chain and from 0.05 percent to 5.0 percent, based on the total weight of the composition, of a benzimidazole having the formula

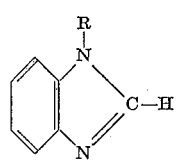

wherein R is an alkyl group containing from 3 to 20 carbon atoms.

3. A new fiber-forming composition of matter comprising a polyolefin derived from a mono-olefin containing from 2 to 10 carbon atoms in the monomeric chain and from 0.5 percent to 2.0 percent, based on the total weight of the composition, of a benzimidazole having the formula

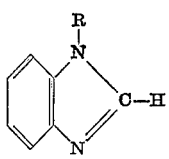

wherein R is an alkyl group containing from 3 to 20 carbon atoms.

4. The composition of matter as defined in claim 3 wherein the polyolefin is polypropylene.

5. The composition of matter as defined in claim 3 wherein the benzimidazole is N-(n-propyl) benzimidazole.

6. The composition of matter as defined in claim 3 wherein the polyolefin is polypropylene and the benzimidazole is N-(n-propyl) benzimidazole.

References Cited by the Examiner
UNITED STATES PATENTS

| | | | |
|---|---|---|---|
| 1,929,560 | 10/1933 | Morton | 260—800 |
| 2,985,617 | 5/1961 | Salyer et al. | 260—45.85 |
| 2,997,456 | 8/1961 | Mills | 260—45.8 |
| 3,022,268 | 2/1962 | Armitage et al. | 260—45.95 |
| 3,033,814 | 5/1962 | Tholstrup | 260—45.95 |
| 3,039,993 | 6/1962 | Friedman | 260—45.8 |

LEON J. BERCOVITZ, *Primary Examiner.*